United States Patent
Hoffman (10) Patent No.: US 7,499,841 B2
(45) Date of Patent: Mar. 3, 2009

(54) APPLICATION FOR MANAGING MODEL-BASED MATERIAL PROPERTIES FOR SIMULATION-BASED ENGINEERING

(75) Inventor: Edward L. Hoffman, Alameda, CA (US)

(73) Assignee: Sandia Corporation, Livermore, CA (US)

( * ) Notice: Subject to any disclaimer, the term of this patent is extended or adjusted under 35 U.S.C. 154(b) by 489 days.

(21) Appl. No.: 10/887,789

(22) Filed: Jul. 8, 2004

(65) Prior Publication Data

US 2006/0010427 A1 Jan. 12, 2006

(51) Int. Cl.
*G06F 17/10* (2006.01)

(52) U.S. Cl. .............. 703/2; 703/22; 702/138
(58) Field of Classification Search .......... 703/2, 703/22; 702/138
See application file for complete search history.

(56) References Cited

U.S. PATENT DOCUMENTS 5,940,788 A * 8/1999 Morman et al. ............ 702/138

OTHER PUBLICATIONS

Hanssen et al., A.G. Validation of Constitutive Models Applicable to Aluminum Foams, International Journal of Mechanical Sciences, vol. 44, Iss. 2, Feb. 2002, pp. 359-406.*

Hao et al., S. Multi-Scale constitutive Model and Computational Framework for the Design of Ultra-High Strength, High Toughness Steels, Computer Methods in Applied Mechanics and Engineering, vol. 193, Iss. 17-20, May 2004, pp. 1865-1908.*

Pailhes et al., J. A Constitutive Model for the Mechanical Behavior of a 3D C/C Composite, Mechanics of Materials, vol. 34, Iss. 3, Mar. 2002, pp. 161-177.*

Bergstrom et al., J.S. Constitutive Modeling of Ultra-High Molecular Weight polyethylene Under Large-Deformation and Cyclic Loading Conditions, Biomaterials, vol. 23, Iss. 11, Jun. 2002, pp. 2329-2343.*

Hayhurst et al., D.R. Constitutive Equations for Time Independent Plasticity and Creep of 316 Stainless Steel at 550 0C, International Journal of Pressure Vessels and Piping, vol. 80, Iss. 2, Feb. 2003, pp. 97-109.*

* cited by examiner

*Primary Examiner*—Russell Frejd
(74) *Attorney, Agent, or Firm*—Dorsey & Whitney LLP; Timothy P. Evans (57) ABSTRACT

An application for generating a property set associated with a constitutive model of a material includes a first program module adapted to receive test data associated with the material and to extract loading conditions from the test data. A material model driver is adapted to receive the loading conditions and a property set and operable in response to the loading conditions and the property set to generate a model response for the material. A numerical optimization module is adapted to receive the test data and the model response and operable in response to the test data and the model response to generate the property set.

20 Claims, 9 Drawing Sheets

APPLICATION FOR MANAGING MODEL-BASED MATERIAL PROPERTIES FOR SIMULATION-BASED ENGINEERING

STATEMENT REGARDING RESEARCH & DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

Information about materials is essential in component and system design. For example, components and systems designed in automotive, aerospace, and microelectronics applications require many different types of materials. Component and systems designers need to have information about the materials in order to select one or more materials that will provide the required performance.

A designer may select a material for use in a component based on one or more design requirements. The designer typically has an in-depth understanding of materials, and is capable of making an appropriate material selection based on the design requirements.

Simulation-Based Engineering

Computer-based physical models are often used in component and systems design to investigate design performance. A physical model requires a geometric representation, a definition of physical loads, a mathematical model of the material response, and model parameters that represent a specific material in the model. The execution of the physical model requires a simulation code which processes the above data and produces a physical simulation of a real event. For example, a physical model of an automobile can be processed in a simulation code to simulate a collision. Physical models are very useful tools in component and systems design as, in most cases, they can be produced more quickly and economically then an actual prototype.

Figure 1:
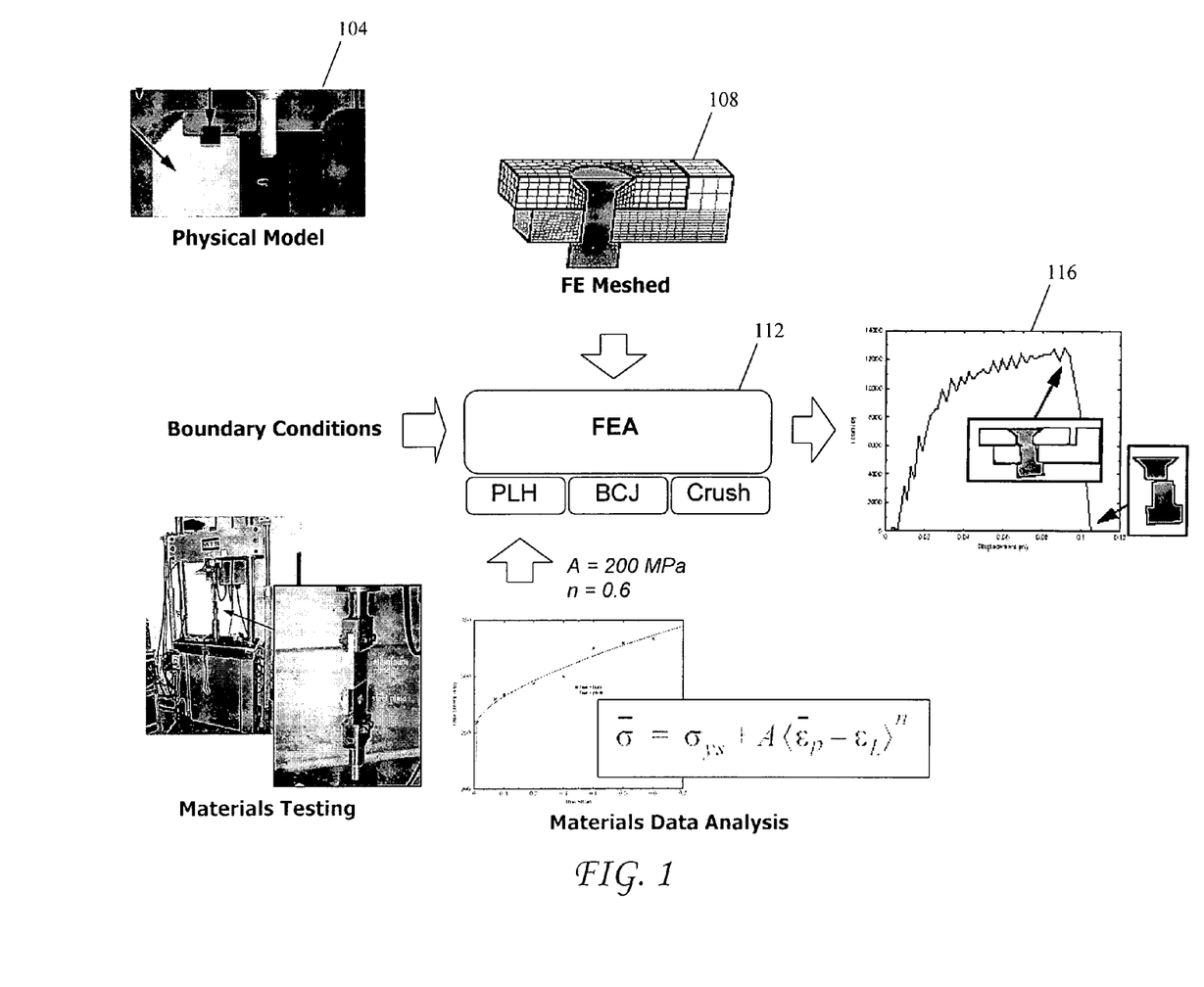
FIG. 1 illustrates a conventional simulation-based design of a component.

FIG. 1 illustrates a conventional simulation-based design of a component. In this simulation-based design, H-11 tool steel, which is a specific type of steel, is used within the context of a Power Law Hardening (PLH) material model.

The simulation-based design begins with a finite element model 104 of the component. The finite element model 104 is one form of a physical model of a component. In a finite element model, the geometry usually originates from a computer aided design (CAD) model.

Next, the finite element model 104 is discretized into regular-shaped elements, called the discretized finite element model 108. The discretized finite element model 108 is represented by one or more mathematical equations.

Next, a simulation code, called a finite element analysis (FEA) code 112, is used to solve the mathematical equations of the discretized finite element model 108. The FEA code 112 is provided with applied loads, boundary conditions and model parameters. The FEA code 112 produces a simulation of the component in response to applied loads, boundary conditions and model parameters. The graph 116 is the simulation result produced by the FEA code 112. The parameters, A and n, shown are specific model parameters that represent H-11 tool steel within the context of a Power Law Hardening (PLH) material model. Using this physical model, a designer can iterate on design details, such as, for example, component geometry or material selection, until the design produces desirable results.

The application of physical models to system and component design is referred to herein as simulation-based engineering. In addition to finite element models, there are many other types of physical models including 'meshless' models that are based on a solid model geometry. The common characteristic of these physical models is that they mathematically represent material response.

The physical models used in simulation-based engineering processes are valuable information assets throughout a product's lifecycle. After a product has been placed in service, a need may arise to reconsider the materials used in the product. There may be a need for a redesign due to an upgrade or modernization of the product or a change in design requirements. There may also be a need for a redesign due to a significant finding investigation. For example, a specific model of a vehicle may be subjected to an investigation following a series of accidents. The investigation may reveal defects associated with one or more components in that vehicle. The entire vehicle model-line may be recalled, and redesign of one or more components may be necessary.

In the above scenario, the original design intent is necessary to determine why a specific material was used in a component. The original design intent is considered a valuable information asset during redesign. Without knowledge of why a designer originally selected the material, it is difficult to select a replacement that will fulfill the new requirements. If the information about the original design intent is lost, the designer will lack important information necessary for a suitable redesign.

The difficulty in identifying material specifications becomes an issue when a component or a system becomes the subject of a modeling study. It may take a considerable amount of time to identify all of the materials in a component or a system.

Constitutive Models

The mathematical model of a material response is referred to as a constitutive model. A constitutive model is a mathematical representation of an ideal material response mode. The constitutive model approximates physical observations of a real material's response over a suitably restricted range. In general, a constitutive model is specific to particular class of material. For example, a plasticity model such as the Power Law Hardening (PLH) model mathematically represents large deformation response beyond the yield strength of a material. Although the PLH model is not specific to any material, in general it produces a good match to the response of metals.

A model parameter is a numeric constant associated with a constitutive model. A constitutive model may include one or more model parameters. A property set is a complete set of model parameters required to numerically model the response of a particular material. The property set for a particular species of material is generally obtained through some estimation process that requires test data.

The constitutive models used in physical models have been developed over time and are based on classical theories of material modeling. A significant number of constitutive models exist and are well documented in literature, and are usually in the form of complex mathematical theories. New constitutive models continue to be developed to address specific needs in component and system design.

A numerical implementation of a constitutive model must be created for it to be integrated into a simulation code. The numerical implementation of a constitutive model is an approximation of a mathematical theory. This is necessary because a constitutive model often requires a numerical approximation of complex mathematical theory, such as an integral equation with no exact solution. Most simulation codes contain a library of constitutive models to handle a wide variety of materials and load conditions.

In order to develop a numerical implementation of a constitutive model, a predicted material response is compared to the response of a constitutive model. The constitutive model's equations are adjusted until the model produces a good match to test data for a variety of materials and load conditions.

Material Model Driver

A material model driver (MMD) is a specialized computer code that can drive the numerical implementation of a constitutive model over a user prescribed load path. When implemented in a simulation code, a numerical implementation of a constitutive model can simulate the model response for a complex three-dimensional geometry. The finite element model illustrated in FIG. 1 is composed of many elements or cells that represent such a complex geometry. For the purposes of validating model performance, it is useful to be able to drive the model in a single cell. This removes geometry complexities and allows the constitutive modeler to focus on the model response over a well-defined load. The MMD is specific to a constitutive model and is usually a simplified version of the three-dimensional model contained in the simulation code. The MMD is generally used in the initial stages of modeling and numerical implementation. It is also used in subsequent parameter estimation algorithms.

Materials Characterization Tests

Materials characterization tests are specialized tests performed to produce the material response represented by the constitutive model. These tests are performed on a material sample of specific shape and under loads within the load-range of interest. The material response as a function of the applied load is measured and recorded. One or more types of materials characterization tests may be necessary for characterizing a given material in the context of a given constitutive model. The materials characterization tests are required to perform parameter estimations for a given material and a given model.

An example of a materials characterization test is a 'uniaxial tensile test' performed to characterize the elastic-plastic response of a metal. A small cylindrical sample of the metal is strain-loaded in an axial direction until it breaks. A one-dimensional load-displacement response is recorded in a stress-versus-strain plot. Within the context of several plasticity models, this test is sufficient for characterizing the material response of a given metal with a continuously increasing load. If the designer wants to simulate a cyclical load or a reverse load, then a materials characterization test that produces this response is needed.

Parameter Estimation

A parameter estimation is the process of calculating a property set for a given material species in the context of a constitutive model given a set of materials characterization tests performed on that material. The end product of this process is a property set that can be used in a physical model to represent a particular type of material in the context of the constitutive model.

The parameter estimation process is typically an iterative one. The loads applied during the tests are applied to the model and the model response is compared to the test response. The parameters are changed until the model response closely matches that of the test data. A variety of numerical optimization methods have been developed that automate the parameter estimation process.

The constitutive models, materials characterization test data, parameter estimation processes, model parameters and property sets representing specific materials are all valuable information assets of simulation-based engineering. Efficient management and preservation of these assets is essential, as their generation typically requires a considerable investment in material testing, material model development and physical simulations. At present there is a need for an application that provides efficient management and preservation of these assets. There is a need for an application that provides a single point of access for designers and analysts to retrieve validated constitutive models, model parameters, materials characterization test data and other assets discussed above. There is a need for an application that provides information to ensure traceability back to test data. There is a need for a collaborative application to support end-to-end data acquisition process. There are is a need for an application to capture and reproduce the parameter estimation process for developed models. There is a need for an application that compares model property sets to material characterization tests, providing greater confidence in their use. There is a need for an application that allows exploratory development of new constitutive models.

SUMMARY OF THE INVENTION

According to one aspect of the invention, an application for generating a property set associated with a constitutive model of a material comprises a first program module adapted to receive test data associated with the material and to extract loading conditions from the test data. A material model driver is adapted to receive the loading conditions and a property set and operable in response to the loading conditions and the property set to generate a model response for the material. A numerical optimization module is adapted to receive the test data and the model response and operable in response to the test data and the model response to generate the property set.

The material model driver is adapted to receive the property set from the numerical optimization module and operable in response to the property set and the loading conditions to generate the model response. The numerical optimization module is operable to execute an optimization algorithm to vary the property set and compare the model response to the test data. The numerical optimization module is operable to vary the property set until the model response matches the test data.

BRIEF DESCRIPTION OF THE DRAWINGS

FIG. 8 shows computer screen shots of a property set and a formatted input for analysis codes.

DETAILED DESCRIPTION OF PREFERRED EMBODIMENTS

The invention is a software application that provides a solution to the above-mentioned problems. In one aspect, the application is an information system for generating, processing, and storing materials information for use in simulation-based engineering. The application can be used to simulate and design components and systems. The application can be used to store and retrieve design information including why a material was selected for a given design application. The application can be used to import validated materials characterization test data. The application can be used to retrieve the test data to calculate model parameters for a variety of constitutive models. The application can be used to retrieve validated model parameters and automatically format the model parameters for a variety of simulation codes. The application can be used to store and retrieve pedigree information for all data to ensure traceability and increase confidence in model parameters. The application can be used to capture and reproduce parameter estimation processes for developed models. The application is easily extensible to new models and therefore can be used for exploratory development of new constitutive models. The application can be used to store information for later reuse in a product's lifecycle and for other engineering design problems as they arise, leveraging a growing repository of materials information.

In one embodiment, the invention is a web-based application framework including data structures and process workflows for managing materials information for model-based simulation and design. The application is built on an extensible architecture that allows addition of new material models. The application comprises several program modules including program codes written in a computer programming language. The programming language may be any well known programming language. The program modules may be a standard subroutine, library or stand-alone programming code.

Application Overview

Figure 2:
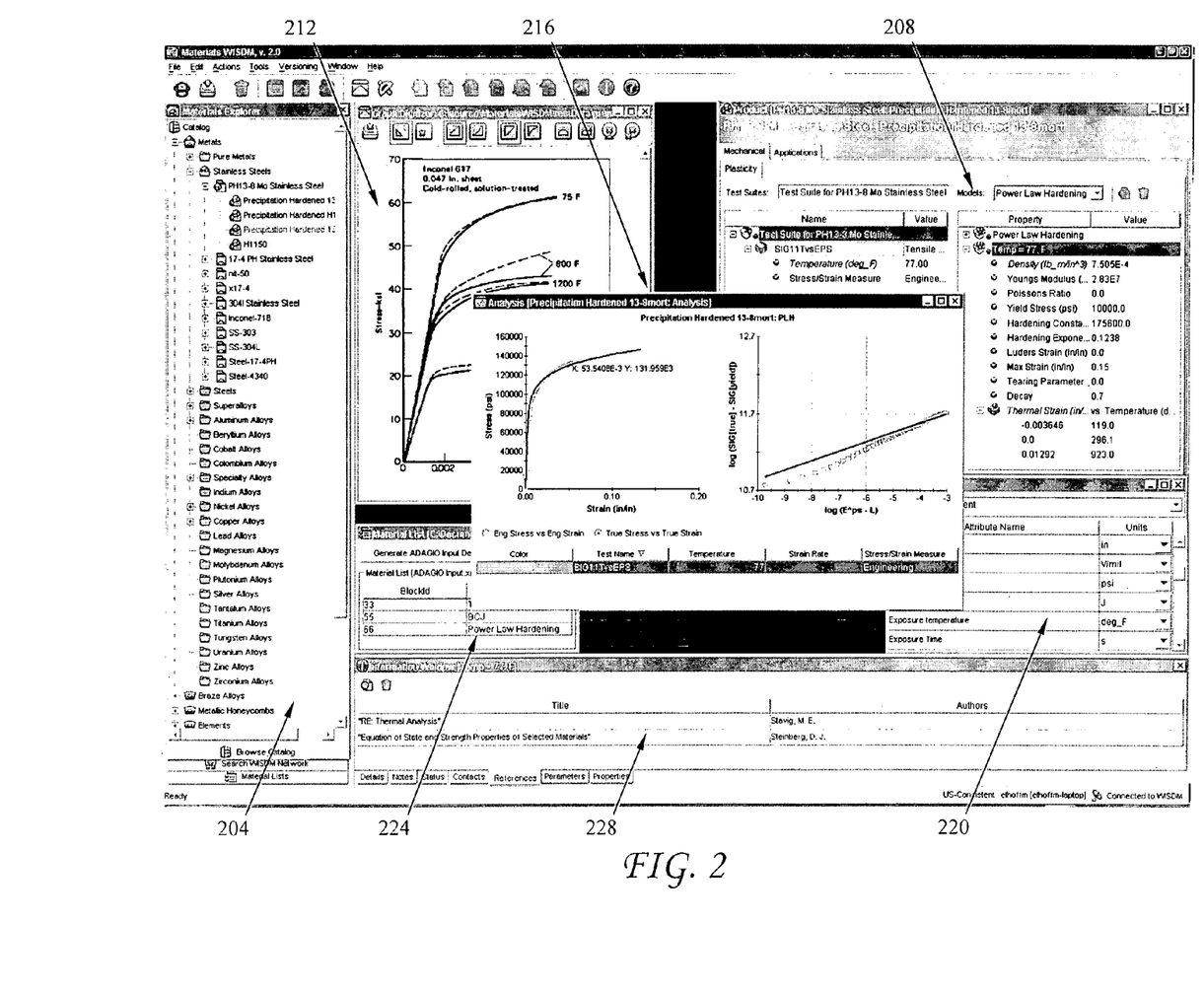
FIG. 2 is a computer screen shot of the application illustrating some of its features.

FIG. 2 is a computer screen shot, including several windows, of the application illustrating some of the features of the application discussed before. A material catalog window 204 includes information about materials contained in the application's database. The information window 208 is a dynamic content window that displays metadata about any item selected in the application, including catalog items, tests, and property sets. Common metadata includes notes, bibliographical references, contacts, and other details such as, for example, descriptive name/value pairs pertaining to a selected object such as 'vendor=Pyrex' for a material product. The graph digitizer window 212 shows test data at various temperatures.

When a product is selected from the catalog (by a double-click), various information about the product including test data, property sets for a variety of constitutive models, are displayed in the product information window 216. A parameter estimation window 220 shows a model response after the model parameters have been calculated. The parameter estimation window shows that the model response matches the test data after the parameter estimation process. A units conversion window 224 allows a user to select the units that the user wants to view data in. All data displayed are automatically converted to the selected units system. A material list window 228 is a virtual 'shopping list' that allows a user to select model-based property sets from the application database and build simulation code input.

Figure 3:
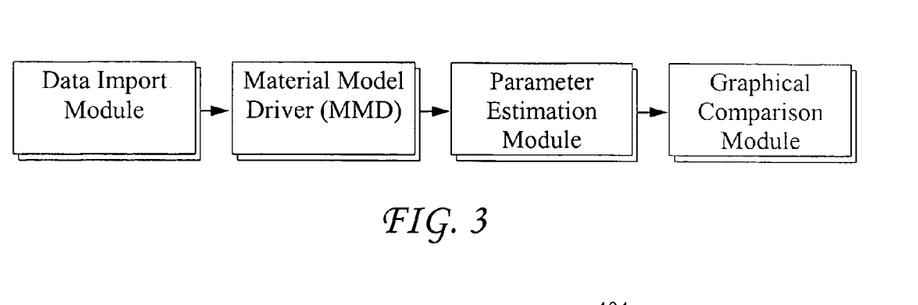
FIG. 3 is a block diagram illustrating the main elements of one embodiment of the application.

FIG. 3 is a block diagram illustrating the main elements of one embodiment of the application. Each block in FIG. 3 represents a program module configured to perform one or more tasks. The application comprises a data input module 304, a material model driver 308, a parameter estimation module 312 and a graphical comparison module 316.

The data input module 304 is configured to receive test data including input conditions associated with a material. The material model driver 308 includes one or more constitutive models. The material model driver 308 is configured to receive input conditions and a property set and executes the constitutive model over a prescribed load path to generate a model response. The output of the material model driver is considered an ideal material response. The parameter estimation module 312 is configured to receive test data and the model response. The parameter estimation module 312 compares the model response to the test data. The parameter estimation module 312 includes a numerical optimization algorithm that varies the property set of the constitutive model until the model response matches the test data. When the model response matches the test data within a user-specified tolerance, the property set is extracted. The graphical comparison module 316 graphically compares the model response to the test data.

Modular Architecture

The application contains a library of constitutive models for many materials. Each constitutive model is considered a software module. New constitutive models may be added to the application through its model Application Programming Interface (API). Each new model is encapsulated in a directory that is added to the application's 'model templates' directory where it is read upon initialization of the application.

An application module consists of several elements:

1. The structure of the property set, including the parameter names, units, and valid value ranges.
2. The structure of the materials characterization tests required to characterize a material species for the given model.
3. The parameter estimation algorithm/algorithms used to obtain model parameters from materials characterization test data.
4. A material model driver (MMD) capable of reproducing the material model response under an arbitrary, prescribed load state. This MMD can have several possible forms. For many models it is sufficient to implement a simplified one-dimensional version of the model and drive it through a prescribed load path. This is sufficient when the materials characterization test data is one-dimensional in nature. In other cases, a full three-dimensional version of the model is necessary to fit the test data. In this case a generalized MMD is included in the application that can be used to drive the actual numerical implementation of the constitutive model as contained in the simulation code.
5. A workflow process employed by a user to use these tools in a logical manner. The workflow process dictates the correct usage of the tools, and the logic used to determine if sufficient data exists to perform the parameter estimation. For example, if the user's data does not sufficiently span the problem space, the model analysis panel should inform the user of this condition and guide the user to provide the necessary data. In another example, if the model requires a particular test type to fit some of its parameters, then these parameters should be 'locked down' if a test of that type does not exist.

Template-Based Data Structures

As discussed earlier, the application provides tools for managing information related to the materials. In one embodiment, a library of test templates configures the application for managing information associated with actual tests conducted on materials. A library of models configures the application for managing constitutive models and associated property sets for materials.

The application manages model-based property sets, and materials characterization test data used to calculate them, for a wide variety of subject matters including thermal, structural, electrical, shock, etc. For a given subject matter model, the data must be valid for the purposes of numerical processing (e.g., parameter estimation). The application uses XML based data templates to define the content and structure of tests and models. By using XML to define these data structures, new models can be incorporated into the application by the user without the need to recompile and release a new version of the application.

An example of a test template is provided below.

The template defines the content and structure of a valid plasticity test, which includes a graph with columns of stress and strain with appropriate units. The template also defines a number of test parameters that are usually extracted from a plasticity test. These are name-value pairs corresponding to either conditions of the test or measurements obtained from the test. In the case of a plasticity test, typical parameters are elastic modulus, Poisson's ratio, test temperature, strain rate, yield strength, and ultimate strength.

The test template is used to validate test data when it is entered into the application so that it is suitable for subsequent processing. In the above example, the parameter estimation module for this plasticity model requires columns of stress and strain.

The test template file can optionally define the location of a custom test viewer for visualizing that type of a test. The viewer is loaded at runtime using a special API in Java programming language called the Java Reflection API. Java Reflection allows a software application to load a software module that is external to the host application. The custom test viewer can also encapsulate logic for processing the test data, in many cases calculating the test parameters from the graph data. If a custom test viewer class is not specified, the default application test viewer is used.

```
<?xml version="1.0" ?>
- <template name="Plasticity" uniqueid="0">
   - <test_suite>
      - <test name="Tensile Test" abrv="Tensile">
         - <columns>
              <column name="Strain" att_type="EPS" default_units="in/in" />
              <column name="Stress" att_type="SIG" default_units="psi" />
           </columns>
         - <parameters>
            - <parameter name="Stress/Strain Measure" abrv="Measure" att_type="String" default_value="True" default_units=""
                  required="true">
                <choice>True</choice>
                <choice>Engineering</choice>
              </parameter>
              <parameter name="Temperature" abrv="T" att_type="TEMP" default_value="293.0" default_units="K"
                  required="false" />
              <parameter name="Strain Rate" abrv="" att_type="RATE" default_value="0.0" default_units="1/sec" required="false" />
              <parameter name="Elastic Modulus" abrv="E" att_type="SIG" default_value="3.e7" default_units="psi"
                  required="false" />
              <parameter name="Poissons Ratio" abrv="nu" att_type="Dimensionless" default_value="0.3" default_units=""
                  required="false" />
              <parameter name="Yield Strength" abrv="" att_type="SIG" default_value="10000" default_units="psi"
                  required="false" />
              <parameter name="Ultimate Strength" abrv="" att_type="SIG" default_value="10000" default_units="psi"
                  required="false" />
              <parameter name="Strain at Ultimate Strength" abrv="" att_type="EPS" default_value="0.1" default_units="in/in"
                  required="false" />
              <parameter name="Percent Reduction in Area" abrv="" att_type="Dimensionless" default_value="0.0"
                  default_units="percent" required="false" />
              <parameter name="Total Strain" abrv="" att_type="EPS" default_value="0.0" default_units="in/in" required="false" />
              <parameter name="Strain Offset" abrv="" att_type="EPS" default_value="0.0" default_units="in/in" required="false" />
           </parameters>
         - <details>
              <detail name="Date" abrv="Date" att_type="String" default_value="" default_units="" required="false" />
            - <detail name="Test Type" abrv="Test Type" att_type="String" default_value="Tensile" default_units="" required="true">
                <choice>Tensile</choice>
                <choice>Compression</choice>
                <choice>Unknown</choice>
              </detail>
           </details>
           <viewer_panel name="Plasticity Test" class="gov.sandia.emc.matwisdm.client.chart.PlasticityTestViewer" />
        </test>
     </test_suite>
  </template>
```

The example test template above shows that a material can be completely characterized by one type of test, a tensile test. In some cases, multiple test types are required to completely characterize a material's response. For example, a visco-plastic model typically requires both a creep test to capture the time-dependent response and a tensile test to capture the plastic response. In these cases, multiple tests can be defined within the test suite of the test descriptor file.

A model template defines the content and structure of a model's property set. The model test template has a pointer to its MMD and custom GUI panels used in the parameter estimation process. An example of a model template for the Power Law Hardening (PLH) constitutive model is provided below.

can also encapsulate logic for capturing workflow and guiding the parameter estimation process. If a custom parameter estimation viewer class is not specified, the default application viewer is used.

The model template can optionally specify the mapping of test column names to the expected inputs of its material model driver class. This is necessary only if the test column names are not the same as those expected by the MMD.

The model and test templates described above are used to validate all data processed by the application. For example, if a user enters an invalid value for a model parameter (as defined by the template) the application rejects the entry and provides feedback to the user.

```xml
<?xml version="1.0" ?>
<!-- DOCTYPE UNIT_CONVERSIONS SYSTEM ".../.../.../model.dtd" -->
- <model name="Power Law Hardening" abrv="PLH" version="1.0.0" author="Ed Hoffman">
    <DISCIPLINE PHYSICS="Mechanical" TYPE="Crush" />
  - <parameters>
      <parameter name="Temperature" abrv="T" att_type="TEMP" default_value="293.0" default_units="K" required="true" />
      <parameter name="Strain Rate" abrv="" att_type="RATE" default_value="0.0" default_units="1/sec" required="false" />
    </parameters>
  - <property_set>
      <property name="Density" abrv="" att_type="DENS" default_value="0.29" default_units="lb_f/in^3" required="false" />
      <property name="Youngs Modulus" abrv="" att_type="SIG" default_value="29.0E6" default_units="psi" required="true" />
      <property name="Poissons Ratio" abrv="" att_type="Dimensionless" default_value="0.3" default_units="" required="true" />
      <property name="Yield Stress" abrv="" att_type="SIG" default_value="10000.0" default_units="psi" required="true" />
      <property name="Hardening Constant" abrv="" att_type="SIG" default_value="200000.0" default_units="psi" required="true"
        autoCalculated="true" />
      <property name="Hardening Exponent" abrv="" att_type="Dimensionless" default_value="0.6" default_units="" required="true"
        autoCalculated="true" />
      <property name="Luders Strain" abrv="" att_type="EPS" default_value="0.0" default_units="in/in" required="true" />
      <property name="Max Strain" abrv="" att_type="EPS" default_value="0.25" default_units="in/in" required="true" />
      <property name="Tearing Parameter" abrv="" att_type="Dimensionless" default_value="0.0" default_units="psi"
        required="true" />
      <property name="Decay" abrv="" att_type="Dimensionless" default_value="0.0" default_units="" required="true" />
    - <tabular_property name="Thermal Strain" abrv="" att_type="EPS" default_value="1.0" default_units="in/in" required="false">
        <property_independent_var name="Temperature" abrv="T" att_type="TEMP" default_units="K" />
        <init_value x="119.0" y="-0.36462E-02" />
        <init_value x="296.0" y="0.00000E+00" />
        <init_value x="923.0" y="0.12916E-01" />
      </tabular_property>
    </property_set>
    <analysis_panel name="PLH Analysis" class="gov.sandia.emc.matwisdm.client.chart.PlhAnalysisPanel" autoCalculated="true"
      lib="PLH.jar" />
  - <mmd model_id="2" model_name="Sierra Power-Law Hardening Plasticity Model">
    - <mmd_line>
        <mmd_input_property name ="Youngs Modulus" />
        <mmd_input_property name ="Poissons Ratio" />
        <mmd_input_property name ="Yield Stress" />
        <mmd_input_property name ="Hardening Constant" />
        <mmd_input_property name ="Hardening Exponent" />
        <mmd_input_property name ="Luders Strain" />
      </mmd_line>
    </mmd>
</model>
```

As defined by the template, the model consists of several model-based properties that describe the elastic and plastic response of a material according to PLH. Two properties, the density and the thermal strain, are not required for all problems and are therefore listed as optional properties. All of the other properties must be present in order for this to be a complete property set.

Figure 4:
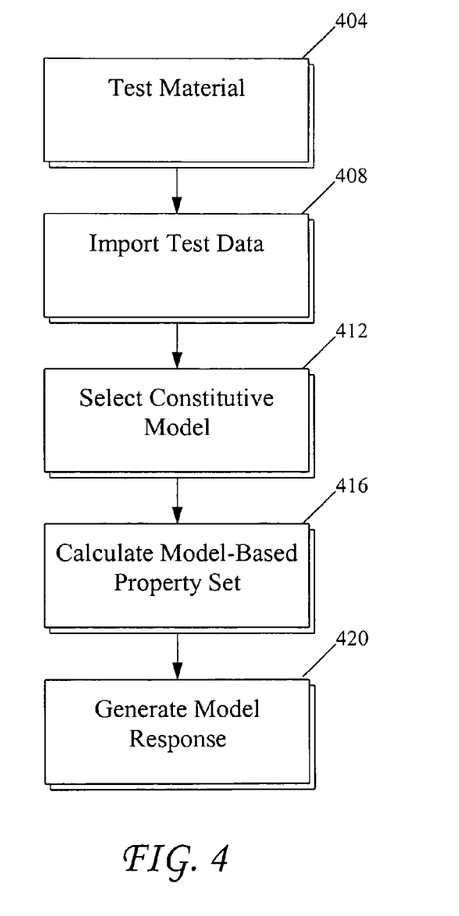
FIG. 4 is a flow diagram of the steps for developing model parameters in accordance with one embodiment of the invention.

The model template can optionally define the location of a custom viewer panel for parameter estimation. The viewer panel is loaded at runtime using a special API in the Java programming language called the Java Reflection API. Java Reflection allows a software application to load a software module that is external to the host application. This viewer Application Process Workflows FIG. 4 is a flow diagram of the steps for developing model parameters in accordance with one embodiment of the invention.

In step 404, a material is subjected to a test to determine a material property (e.g., hardness, ultimate strength, etc.). The material may be steel, aluminum alloy, copper alloy or any other material of interest. In step 408, the test data is collected and recorded.

Next, in step 412, a constitutive model is selected based on the test data. The constitutive model is a mathematical representation of a particular material response in a specific environment.

In order to assist the application to select an appropriate constitutive model from the library, information about the material and the tests are provided to the application. For example, the application may require information about the type of material (e.g., steel), the type of response (e.g., stress versus strain characteristics), and test conditions (e.g., temperature). Based on the information, the application selects a constitutive model that generally approximates the material response.

In step 416, the response of the constitutive model is generated under input conditions similar to the input conditions in step 404. In step 420, the response of the constitutive model is compared to the test data and a parameter estimation process is used to calculate the model parameters. Once the model parameters are calculated, they are recorded and incorporated into the constitutive model to provide a graphical representation of the model response. The complete set of model parameters required to numerically model the response of a particular material is called a property set.

Importing Test Data

The application provides tools for importing test data. An integrated graph digitizer allows users to scan graphical images of tests, digitize the image, and then import it into the application for visualization and numerical processing. A flexible wizard-based import mechanism allows users to import data in arbitrary formats. The benefits to the designer are: management of materials characterization data; publication of test data to a potentially broader audience; and data re-use in subsequent engineering activities. The application validates the test data entered for completeness. If the application determines that a test entry is not valid, the application does not accept the data.

Parameter Estimation Using Numerical Optimization Algorithm

The application includes a library of various constitutive models of materials. While these constitutive models may provide a general response pattern of a class of materials, the model parameters must be estimated to provide an accurate response of a specific material.

The constitutive model typically includes one or more model parameters. As discussed before, a model parameter is a numeric constant associated with a constitutive model. The model parameters must be calculated in order to develop a constitutive model that accurately predicts the material response.

The application provides a framework to automate and preserve parameter estimation algorithms and make them more fault-tolerant by managing code exceptions and providing useful feedback to the user. This capability allows retention of valuable expert processes used in parameter estimation process.

Figure 5:
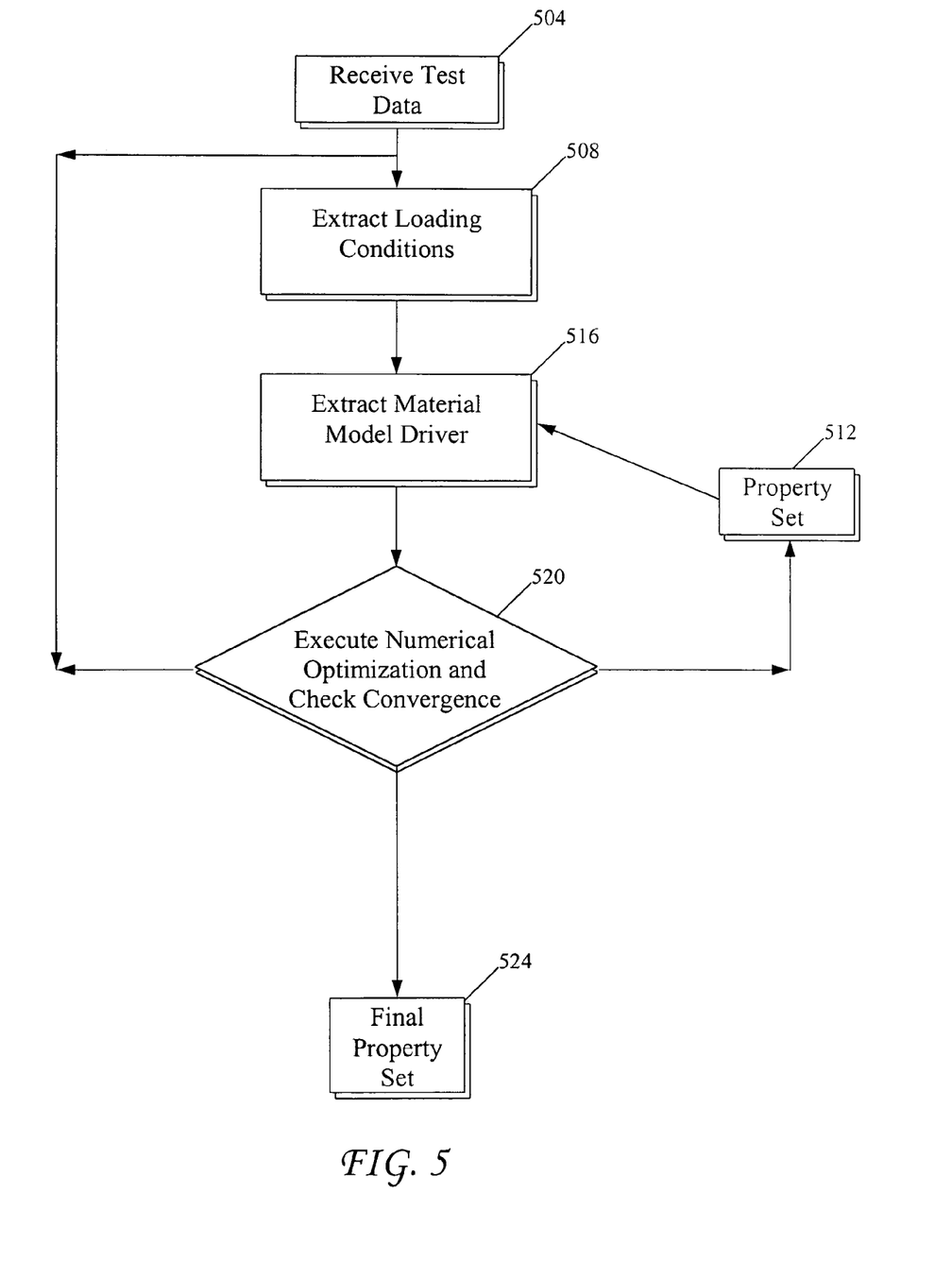
FIG. 5 illustrates a parameter estimation process in accordance with one embodiment of the invention.

FIG. 5 illustrates the parameter estimation process in accordance with one embodiment of the invention. The process uses a material model driver (MMD) to drive a constitutive model over the load path applied in a test. The process further uses an iterative numerical optimization algorithm to estimate a property set that produces the best possible match to test data.

In step 504, test data is received by the application. In step 508, loading conditions are extracted from the test data. In step 512, an initial guess is made of all parameters in the property set.

In step 516, a material model driver receives the loading conditions and the initial property set. The material model driver executes a constitutive model and generates a model response based on the loading conditions and the initial property set.

In step 520, a numerical optimization algorithm is executed to generate an updated property set. The numerical optimization algorithm receives the model response and the test data. The numerical optimization algorithm compares the test data with the model response. The algorithm varies the property set associated with the constitutive model until the model response most closely matches the test data.

The numerical optimization algorithm generates a new property set after each iteration. The new property set is then provided to the material model driver to generate the model response. When the model response most closely matches the test data (i.e., the model response converged with the test data), in step 524 the property set is extracted as the final property set.

The purpose of the numerical optimization algorithm is to minimize the sum of the squares of m nonlinear functions in n variables. The n variables are the model parameter set. The m functions are functional evaluations of the model through the material model driver. In one embodiment, the algorithm used in the application is a modified version of the Levenberg-Marquardt algorithm. It will be obvious to those skilled in the art that other numerical optimization algorithms can also be used.

Parameter estimations for a given model are based on test data under a well defined load path. For each parameter estimation routine, a functional (i.e., numerical subroutine) must be provided which calculates the 'ideal' response under the same load conditions as the test. The functional is the material model driver. The numerical optimization routine then compares the ideal model response to the test data and computes the error. The algorithm then iteratively searches the mathematical space of the model, adjusting the model parameters until the best fit is achieved.

Graphical Comparison of Model Response to Test Data

Another feature of the application is it allows designers to see a graphical comparison of the property set (in the context of the constitutive model) to actual materials characterization test data. It is commonly accepted that no one property set is appropriate for an entire problem space. Property sets are usually optimized for a particular problem space. For example, a property set of a plasticity model may provide a good match for small strain problems, while another may provide a good match for large strain problems. The capability to see a graphical comparison of the model to test data allows designers to determine if the property set matches the test data in the problem space of interest. If not, the designer can create a new property set and optimize it for the problem space of interest.

Figure 6:
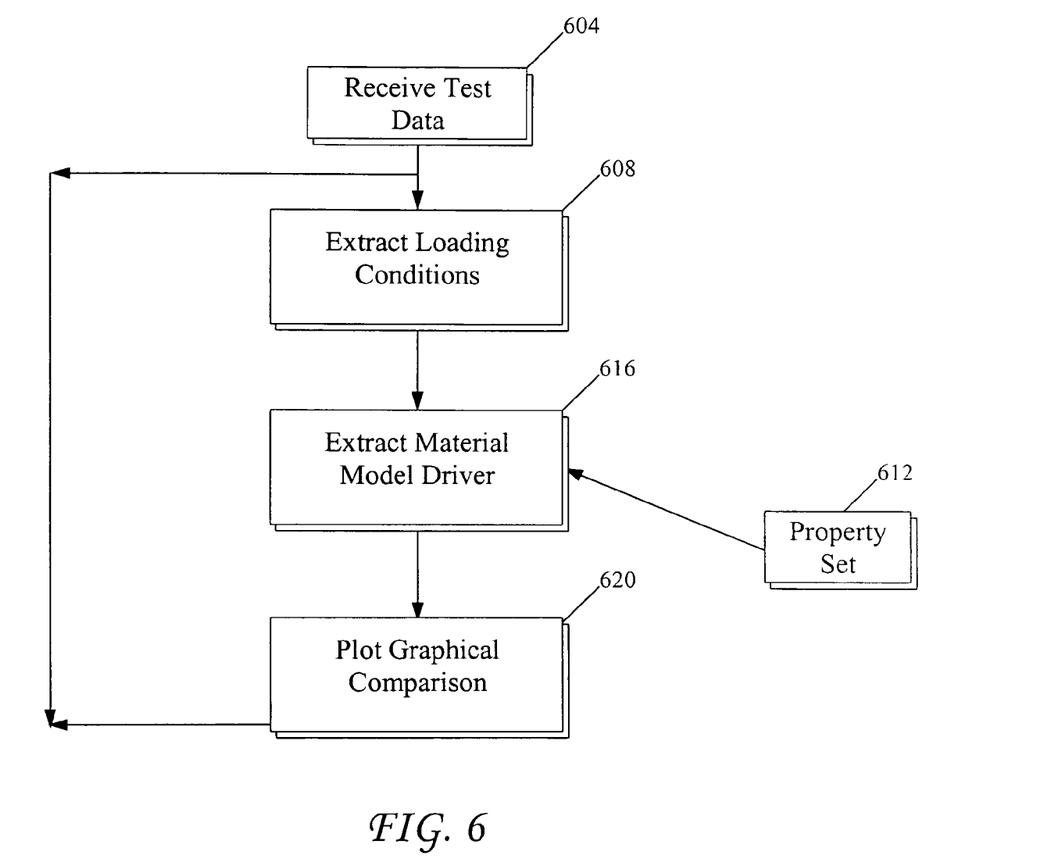
FIG. 6 is a flow diagram of the steps for a graphical comparison of a constitutive model to test data

FIG. 6 is a flow diagram of the steps for a graphical comparison of a constitutive model to test data. The application uses the material model driver (MMD) to drive the constitutive model over the load path applied in the test.

Figure 7:
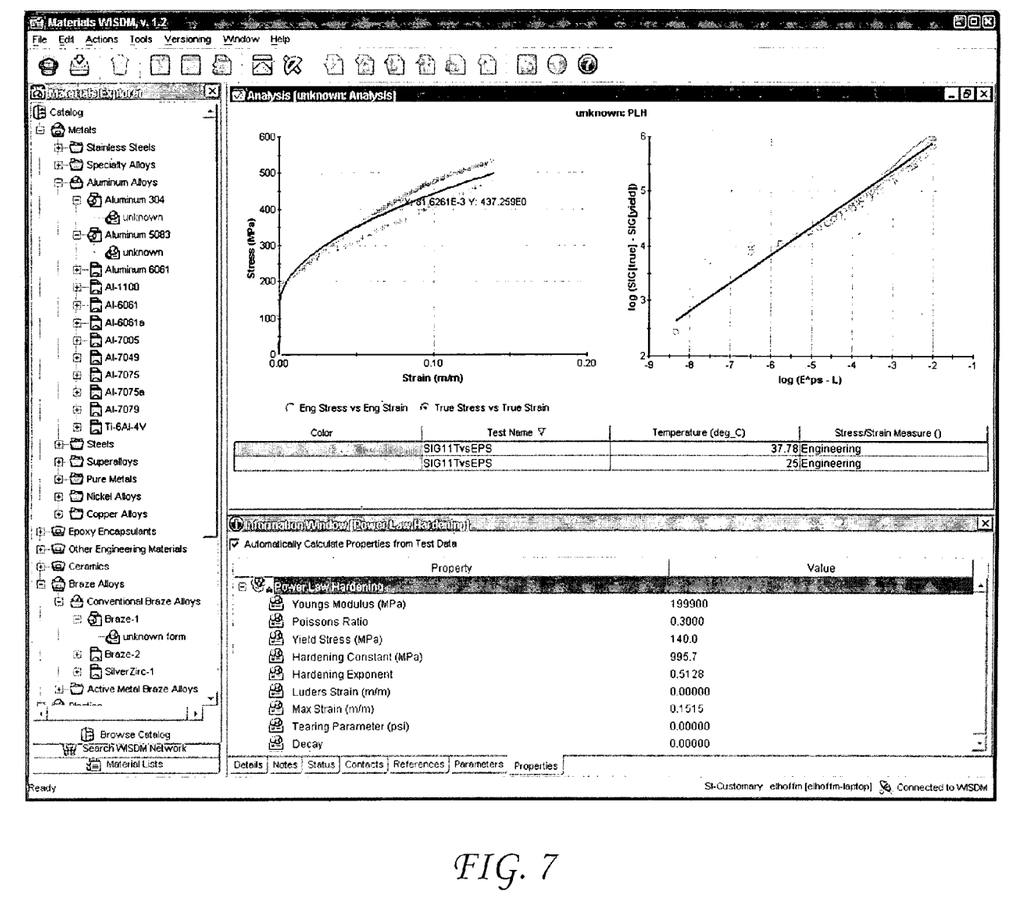
FIG. 7 is a computer screen shot of a parameter estimation process and graphical comparison of model response to test data.

In step 604, test data is received by the application. In step 608, the loading conditions (i.e., input conditions) are extracted from the test data. In step 612, a user selected property set is received by the application. In step 616, a material model driver receives the loading conditions and the property set and executes a constitutive model response. In step 620, the constitutive model response and the test data are displayed and compared graphically. The application includes a program module that creates a graphical image of the test data and the model response. FIG. 7 is a computer screen shot of a parameter estimation process and graphical comparison of model response to test data.

Automatic Generation of Simulation Code Input

The application provides automatic generation of analysis code input decks for a variety of modeling and simulation codes. The material list capability is a virtual 'shopping cart' that allows the designer to browse the database and select property sets for a particular problem. After making the selections, the designer simply selects the 'generate input deck' button, and the property sets are formatted in the syntax of the desired analysis code. FIG. 8 are computer screen shots illustrating a property set and a formatted input for analysis codes, respectively.

The application can be easily extended to support new simulation codes. Using data transformation mechanisms based on XML and XSLT, the input-generation component of the application can be easily configured to support new simulation codes.

Capturing Design Data

The application provides a variety of capabilities to support materials selection process. Using the application, a designer can document the association of a material with a component, including metadata such as notes documenting the design intent behind the materials selection and appropriate references. The benefits to the designer are the preservation of design intent and the storage of materials selections in a convenient format.

Once a material is selected for use in a system component, the designer can identify the vulnerability of the system through modeling and simulation. The designer can identify relevant constitutive models for the simulation to represent the subject matter involved in the vulnerability study. If the required model parameters do not exist for the materials of interest, the designer identifies the suite of test data required to perform a parameter estimation study. This data is either found in literature, or the designer can gather the required data through a series of materials characterization tests.

Illustrative Example

The mathematical equation below represents a Power Law Hardening (PLH) constitutive model. The constitutive model approximates the post-yield stress versus strain response of a material using the following power law relationship:

$$\sigma = \sigma_{ys} + A < \epsilon_p - \epsilon_L \geq^n$$

where $\sigma$ is the output, $\epsilon_p$ is the input, and A, n and $\epsilon_L$ are model parameters. It is necessary to determine the value of A, n and $\epsilon_L$ in order for the constitutive model to accurately predict the response of a particular material species (e.g. annealed 304L stainless steel, or pure copper).

Figure 9:
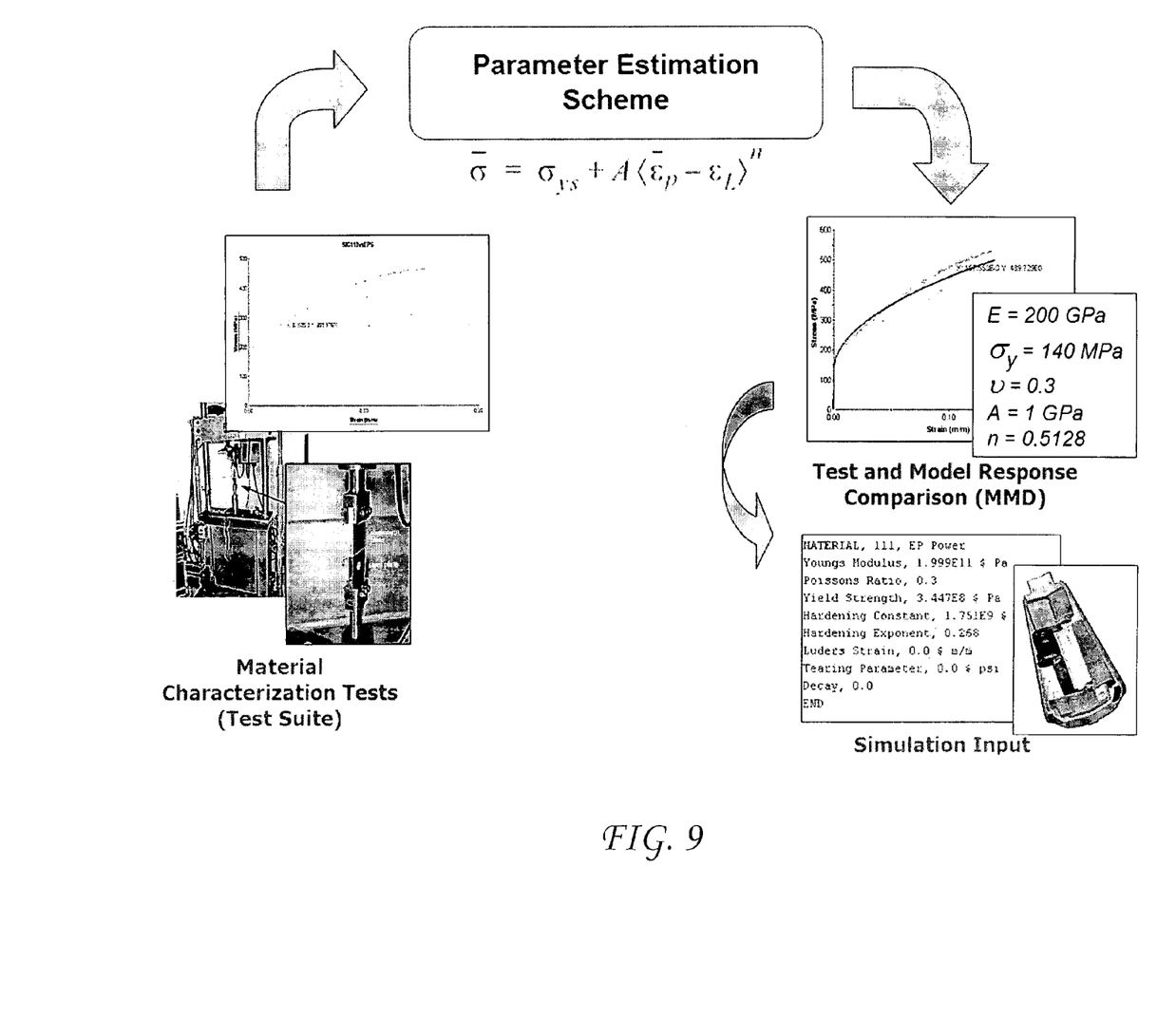
FIG. 9 further illustrates the process for determining the model parameters.

FIG. 9 further illustrates the process for determining the model parameters. In FIG. 9, a material is subjected to one or more tests. The test data is digitized and displayed in the form of a graph. A parameter estimation scheme is used to calculate the property set and the response of the constitutive model is then compared to the test data. According to the parameter estimation scheme, the model parameters are varied until the model response fits the test data. Once the property set is calculated, the application generates a simulation input that includes the property set in a specified format. The model response can be compared to the test data to increase confidence in the property set. The property set can be used in a physical model by transforming it into syntax appropriate for a particular simulation code. The model-based property set is stored in the database and are subsequently used by designers for simulation-based engineering problems.

Distributed Architecture

Figure 10:
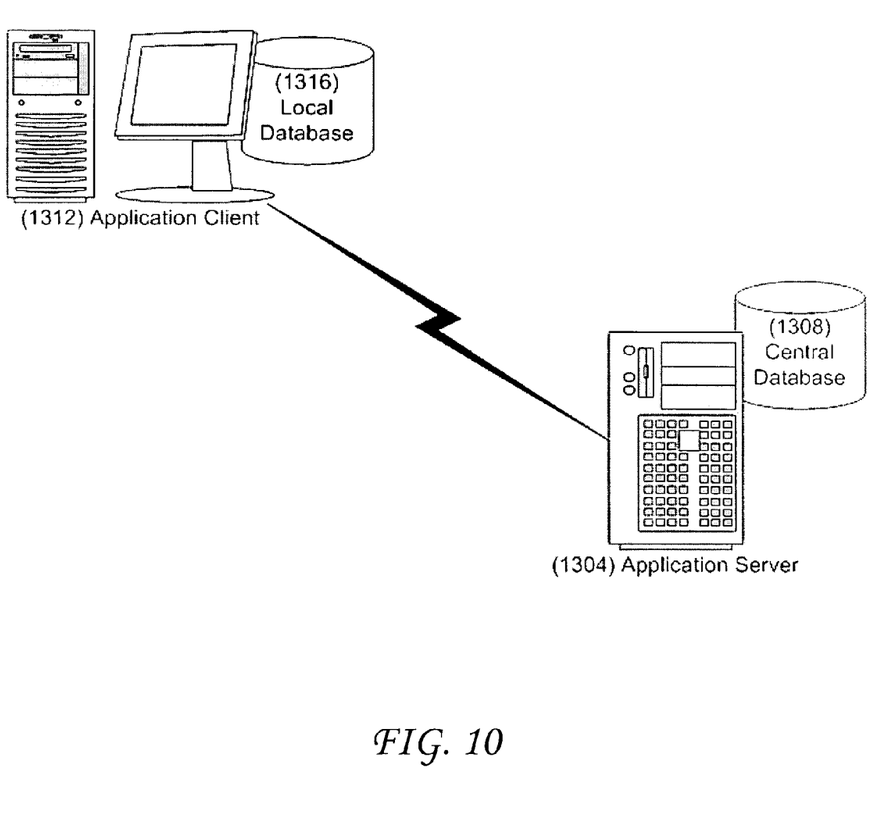
FIG. 10 shows a distributed network architecture in accordance with one embodiment of the invention.

The application can be implemented in a distributed architecture environment. FIG. 10 shows a distributed network architecture including a network server 1004 and a network storage system 1008. The application resides in the storage system 1008. A computer 1012 is connected to the network server 1004 via the Internet, an intranet or any other communication link. The application also resides in a local storage 1016. A user accesses the application residing in the local storage 1016. As new constitutive models are developed, the library associated with the application is updated in the network storage 1008. The server 1004 automatically updates the application residing in the local storage 1016.

Programming Language

In one embodiment, the application is a client-server application written in the Java programming language. The Java programming language is a machine-independent language, which allows the application to be deployed on a variety of platforms, including: MS Windows, Linux, Unix, and Macintosh OSX. The server-side code is written in accordance with the J2EE (Java 2 Enterprise Addition) specification, which allows the server code to be deployed on a variety of J2EE application servers (e.g., JBoss, BEA WebLogic, IBM WebSphere, etc). The Java language specification provides a number of additional benefits such as the Java Reflection API, which allows the model modules to be loaded at runtime without the need to recompile the entire application.

Being an object-oriented programming language, Java provides many features common to modern programming languages like inheritance, polymorphism, and interfaces. These features provide greater flexibility to a software architecture. For example, software components like the material model driver can be designed around a common interface so that, to the application, all material model drivers look the same. The concept of polymorphism implies that the application does not need to know what kind of material model driver it is executing, but only needs to know how to interact with the common interface. It will be obvious to those skilled in the art that the application can be written in other programming languages.

It will be understood that even though various embodiments and advantages of the present invention have been set forth in the foregoing description, the above disclosure is illustrative only, and changes may be made in detail, and yet remain within the broad principles of the invention. For example, many of the software modules and components described above may be written in other programming languages. Therefore, the present invention is to be limited only by the appended claims.

What is claimed is:

1. An application including program code which when executed on a computer, would cause the computer to generate a set of modeling parameters for modeling the response of a material to a set of loading conditions (a "property set") and for visualizing the correspondence between the measured response of the material to the loading conditions and the response of the model, comprising:

a first program module operable to receive test data associated with the material and to extract the loading conditions from the test data;

a material model driver operable to receive the loading conditions and an initial property set and operable in response to the loading conditions and the initial property set to generate an initial model response for the material;

a numerical optimization module operable to receive the test data and the model response and further operable in response to the test data and the model response to generate an optimized property set; and a graphical comparison module operable to receive the model response and the test data and operable to graphically compare and display the model response and the test data, thereby providing a user with a comparison of the correspondence between of the model response and the measured response of the material.

2. The application of claim 1 wherein the material model driver is operable to receive the optimized property set from the numerical optimization module and further operable in response to the optimized property set and the loading conditions to generate an optimized model response.

3. The application of claim 1 wherein the numerical optimization module is operable to execute an optimization algorithm to vary the property set and compare the model response to the test data.

4. The application of claim 3 wherein the numerical optimization module is operable to repeat the steps of claim 3 after varying the property set until the model response matches the test data.

5. The application of claim 4 further comprising a third program module operable to extract the optimized property set from the numerical optimization module as a final property set when the model response matches the test data.

6. The application of claim 1 wherein the property set is a set of numeric constants.

7. A method using a computer including program code for generating a property set associated with a constitutive model for a material, the method comprising:

receiving test data associated with the material in a computer;

extracting loading conditions from the test data;

generating a model response based on the loading conditions and a property set;

generating a final property set by optimizing the model response to match the test data; and generating a graphical image of the test data.

8. The method of claim 7 wherein the step of generating a model response comprises receiving the loading conditions and the property set into a material model driver and executing the material model driver.

9. The method of claim 7 wherein generating the final property set comprises comparing the model response to the test data and varying the property set until the model response matches the test data.

10. The method of claim 7 wherein generating the final property set comprises executing a numerical optimization algorithm to vary the property set until the model response matches the test data.

11. A method, which when executed by a computer, will cause the computer to generate a set of modeling parameters for modeling the response of a material to a set of loading conditions (a "property set") and for visualizing the correspondence between the measured response of the material to the loading conditions and the response of the model, the method comprising:

receiving test data associated with the material in a computer;

extracting the loading conditions from the test data;

generating a model response based on receiving the loading conditions and an initial property set into a material model driver and then executing the material model driver;

generating a final property set by optimizing the model response to match the test data; and generating a formatted analysis code input from the final property set; and executing the formatted analysis code input and displaying a graphical representation of the correspondence between the measured response of the material to the loading conditions and the response of the model.

12. The method of claim 11 wherein the step of generating a final property set further comprises extracting the final property set from a numerical optimization module when the model response matches the test data.

13. An application including program code, which when executed on a computer, would cause the computer to generate a set of modeling parameters for modeling the response of a material to a set of loading conditions (a "property set") and for visualizing the correspondence between the measured response of the material to the loading conditions and the response of the model, comprising:

a first program module operable to receive test data associated with the material and to extract the loading conditions from the test data;

a material model driver operable to receive the loading conditions and an initial property set and operable in response to the loading conditions and the initial property set to generate a model response for the material;

a numerical optimization module operable to receive the test data and the model response and further operable in response to the test data and the model response to generate an optimized property set;

an input deck module operable to receive the optimized property set and further operable to generate a formatted analysis code input of the optimized property set; and simulation code operable to execute the formatted analysis code input to provide a graphical representation of the correspondence between the measured response of the material to the loading conditions and the response of the model.

14. The application of claim 13 wherein the numerical optimization module is operable to execute an optimization algorithm to vary the property set and compare the model response to the test data.

15. The application of claim 13 wherein the material model driver is operable to generate a new model response in response to a new property set from the numerical optimization module.

16. An application including program code, which when executed on a computer, would cause the computer to generate a set of modeling parameters for modeling the response of a material to a set of loading conditions (a "property set") and for visualizing the correspondence between the measured response of the material to the loading conditions and the response of the model, comprising:

an extensible model library having one or more model templates, each model template being operable to define a plurality of constitutive models and one or more initial property sets associated with each of the defined constitutive models;

a first program module operable to receive test data associated with the material and to extract the loading conditions from the test data;

a material model driver operable to receive the loading conditions and an initial property set and operable in response to the loading conditions and the property set to generate a model response for the material;

a numerical optimization module operable to receive the test data and the model response and further operable in response to the test data and the model response to generate an optimized property set;

an input deck module operable to receive the optimized property set and further operable to generate a formatted analysis code input of the optimized property set; and simulation code operable to execute the formatted analysis code input to provide a graphical representation of the correspondence between the measured response of the material to the loading conditions and the response of the model.

17. The application of claim 16 wherein the property set is a set of numeric constants.

18. The application of claim 16 wherein the material model driver is operable to receive a new property set from the numerical optimization module and operable in response to the new property set and the loading conditions to generate a new model response.

19. The application of claim 16 wherein the numerical optimization module is operable to execute an optimization algorithm to vary the property set and compare the model response to the test data.

20. The application of claim 16 further comprising a test library having one or more test templates, wherein each test template is operable to define a materials characterization test.

* * * * *